United States Patent [19]

Tsuriya

[11] Patent Number: 5,098,941
[45] Date of Patent: Mar. 24, 1992

[54] PROCESS FOR PRODUCING PHENOLIC RESIN COMPOSITION AND RUBBER COMPOSITION CONTAINING THE COMPOSITION

[75] Inventor: Masaaki Tsuriya, Yaizu, Japan

[73] Assignee: Sumitomo Durez Company, Ltd., Tokyo, Japan

[21] Appl. No.: 530,708

[22] Filed: May 30, 1990

[30] Foreign Application Priority Data

Jun. 8, 1989 [JP] Japan .................................. 1-144003
Jun. 8, 1989 [JP] Japan .................................. 1-144004
Jun. 8, 1989 [JP] Japan .................................. 1-144005

[51] Int. Cl.$^5$ ............................................. C08L 93/04
[52] U.S. Cl. .................................... 524/270; 524/510;
525/501.5; 525/502
[58] Field of Search ............................ 524/510, 270;
525/501.5, 502

[56] References Cited

U.S. PATENT DOCUMENTS

| | | | |
|---|---|---|---|
| 3,108,978 | 10/1963 | McNaughtan | 525/501.5 |
| 4,326,576 | 4/1982 | Mizumoto et al. | 524/511 |
| 4,546,143 | 10/1985 | Weil et al. | 524/511 |
| 5,001,185 | 3/1991 | Teratani et al. | 524/511 |

*Primary Examiner*—Paul R. Michl
*Assistant Examiner*—Edward J. Cain
*Attorney, Agent, or Firm*—Browdy and Neimark

[57] ABSTRACT

Disclosed is a process for producing a phenolic resin composition characterized in that a novolak type phenolic resin modified with an unsaturated oil or an aromatic hydrocarbon resin, and hexamine are used as essential components, and these are kneaded by an open roll or a kneading extruder, whereby 30–90% of the hexamine used is converted into the adduct thereof. A rubber composition containing the phenolic resin composition produced by the above process is also disclosed.

11 Claims, No Drawings

PROCESS FOR PRODUCING PHENOLIC RESIN COMPOSITION AND RUBBER COMPOSITION CONTAINING THE COMPOSITION

The present invention relates to a process for producing a specific phenolic resin composition and a rubber composition containing the phenolic resin composition, particularly, a rubber composition for bead filler of tire.

Hitherto, in order to improve properties of natural rubber and synthetic rubber such as hardness and modulus, thermosetting resins, above all, phenolic resins have been used in methods which use a large amount of additives such as sulfur, vulcanization accelerator, and carbon black.

Phenolic resins can be roughly classified into the two types of novolak type and resol type. The former alone is low in reinforcing effect and is usually used together with hexamethylenetetramine (hereinafter referred to as "hexamine") which is a curing agent. Generally, for example, novolak type phenolic resin containing hexamine is added to rubber, or novolak type phenolic resin and hexamine are separately incorporated into rubber in kneading of the rubber.

In vulcanization of a rubber composition containing a novolak type phenolic resin and hexamine, the novolak type phenolic resin reacts with hexamine to cure the composition and in this case ammonia gas is generated. This ammonia gas has strong irritating odor and is toxic and hence is not desired for environmental hygiene and thus the amount of ammonia gas generated must be as small as possible.

Particularly, when such a rubber composition is used as a bead filler rubber of tire, the generated ammonia gas and unreacted and remaining hexamine may deteriorate carcass cords of automobile tires in which polyester fibers are used.

For solving the above problems, attempt was made to use various curing agents in place of hexamine, such as methylol melamines, paraformaldehyde, resol type phenolic resins, morpholines, benzoquinone, trioxane, and isocyanates, but none of them were able to attain the desired reinforcing effect. Furthermore, use of resol type phenolic resin which can be thermally cured without hexamine, in place of novolak type phenolic resin can be considered. However, resol type phenolic resins exhibit some reinforcing effect for NBR (nitrile rubber) or CR (chloroprene rubber), but exhibit substantially no reinforcing effect for natural rubber and the so-called non-polar rubbers such as polybutadiene rubber and styrene-butadiene copolymer rubber. Thus, resol type phenolic resins have limitation in use as a substitute for novolak type phenolic resins.

Under the circumstances, the inventors have conducted intensive research in an attempt to obtain reinforcing effect equal to or higher than the conventionally obtained effect particularly for tire by reducing amount of hexamine as much as possible in the system of novolak type phenolic resin-hexamine which is added for reinforcement of rubbers, and as a result, the present invention has been accomplished.

That is, the present invention provides a process for producing a phenolic resin composition, characterized in that a novolak type phenolic resin modified with an unsaturated oil or an aromatic hydrocarbon resin, and hexamine are used as essential components, and these are kneaded by an open roll or a kneading extruder, whereby 30-90% of the hexamine used is converted into the adduct thereof, and furthermore provides a rubber composition containing said phenolic resin composition.

The hexamine converted into the adduct thereof as defined in the present invention means hexamine which is not extracted with deionized water. In this case, temperature of the water is 25±1° C.

Usually, hexamine which is merely mixed with phenolic resin can be easily extracted with water, but hexamine converted into the adduct thereof, namely, hexamine which forms intermolecular addition product with phenolic resin is not extracted with water. From this, adduct-forming rate of hexamine can be obtained from the following formula.

$$\text{Adduct-forming rate} = \frac{A - B}{A} \times 100\%$$

A: Total amount of hexamine
B: Amount of hexamine extracted with deionized water The amount A can be obtained by Kjeldahl method, liquid chromatography, elemental analysis method, or the like. The amount B can be obtained by titration on the amount of hexamine extracted with deionized water. For measurement, particle size of sample should be 150 μm or less, and if the particle size is larger than it, the sample should be finely divided to 150 μm or less in particle size and then subjected to measurement.

The novolak type phenolic resin modified with an unsaturated oil or an aromatic hydrocarbon resin used in the present invention includes novolak type phenolic resins modified with unsaturated oils such as cashew oil, tall oil, linseed oil, various unsaturated animal oils and vegetable oils, unsaturated fatty acids, and rosin, and novolak type phenolic resins modified with aromatic hydrocarbon resins such as toluene resin, xylene resin, and mesitylene resin. Among them, particularly preferred are those which are modified with cashew oil, tall oil or linseed oil.

In modification with these unsaturated oils, modification rate of oil based on total novolak type phenolic resin in the composition is preferably 10-50%, more preferably 15-45%. When oil modification rate is less than 10%, effect of modification is insufficient, and when it is more than 50%, proportion of free oil which has not reacted with phenolic resin portion increases and characteristics of such modified phenolic resin as a reinforcing material are deteriorated.

For production of the novolak type phenolic resin modified with unsaturated oil, there are used processes which comprise reacting phenols such as phenol, cresol and resorcin with aldehydes such as formaldehyde, paraformaldehyde and benzaldehyde using acid catalysts such as oxalic acid, hydrochloric acid, sulfuric acid and p-toluenesulfonic acid, followed by modification with oils such as cashew oil, tall oil and linseed oil.

The phenolic resin of the present invention further includes these phenolic resins modified with at least one of epoxy resin, aniline, melamine and rubber, and these phenolic resins into which unmodified novolak type phenolic resin, resol type phenolic resin, and the like are simultaneously incorporated.

A small amount of a synthetic or natural resin such as epoxy resin, melamine resin, coumarone resin or rosin may be added as a part of the composition.

Content of hexamine in the phenolic resin composition is preferably 2.5-12.5%. When content of hexamine is less than 2.5%, reinforcing effect for rubber is low, and when it is more than 12.5%, the amount of ammonia gas generated at vulcanization increases and this is not preferred.

The phenolic resin composition of the present invention is usually in the state of solid or powders and is prepared by kneading solid or powdery phenolic resin and hexamine by an open roll or a single- or multi-screw kneading extruder.

When phenolic resin and hexamine are kneaded by an open roll, adduct-forming rate of the resulting resin composition depends on the number of rolling times (the number of passing times of the mixture through the rolls), pressure applied by the rolls and surface temperature of the rolls. Usually, adduct-forming rate increases with increase in the number of rolling times, the pressure applied by rolls and the surface temperature of rolls. Pressure applied by rolls is determined b size of rolls and gap between the two rolls. Phenolic resins of desired adduct-forming rate can be obtained by proper control of these conditions. Among these conditions, when the surface temperature of rolls is high at a certain temperature or above, if the number of rolling times increases, curing reaction between the resin and hexamine starts and molecular weight of the resin increases and in some cases partial gelation occurs. This causes variation in quality of the resulting resin and besides brings about reduction in reinforcing action when the resin is blended with rubber.

On the other hand, if the surface temperature of rolls is too low, adduct formation is difficult to occur and besides, the kneaded product containing phenolic resin and hexamine cannot be processed into sheet to result in reduction of operability. In general, when melting point of the resin to be kneaded (in the case of two or more resins being blended, said melting point is one measured after uniformly mixing the resins at the given blending rate) is assumed as T° C., the surface temperature of rolls is preferably set at a temperature which is not higher than T° C. by 20° C. or more and is not lower than T° C. by 40° C. or more. When melting point of the resin is high, it is not preferred that the surface temperature of rolls exceeds 100° C.

When adduct is formed using a single-, twin- or multi-screw kneading extruder adduct-forming rate of the resulting resin depends mainly on residence time in the extruder, temperature of the kneaded product of resin and hexamine in residence and pressure applied to the kneaded product in residence. Usually, the adduct-forming rate increases with increase in residence time, temperature of kneaded product and pressure applied. Phenolic resins of the desired adduct-forming rate can be obtained by proper control of these conditions. Among these conditions, in case of the temperature of kneaded product residing in the extruder being high at a certain temperature or above, when residence time increases, curing reaction between the resin and hexamine starts and molecular weight of the resin increases and in some cases partial gelation occurs. This causes variation in quality of the resulting resin and moreover brings about reduction of reinforcing effect when it is incorporated into rubber. On the other hand, when temperature of kneaded product in residence is too low, the resulting adduct-forming rate is lower than the desired adduct-forming rate if residence time is not prolonged, and this is not preferred. When melting point of the resin to be kneaded (in case of blending two or more resins, the melting point is one measured after uniformly mixing them at the given mixing ratio) is assumed as T° C., discharging temperature of kneaded product is preferably set at a temperature which is not higher than T° C. by 40° C. or more and is not lower than T° C. by 20° C. or more. It is convenient to control the temperature at discharging of kneaded product in place of the temperature of kneaded product in residence, and the present invention is hereinafter explained using the discharging temperature. The residence time is preferably 5 seconds or more and 30 minutes or less.

Adduct-forming rate of hexamine in the phenolic resin composition obtained in this way preferably 30–90%. If the adduct-forming rate is less than 30%, the effect to improve reinforcement by forming adduct is insufficient. If it is more than 90%, generally the resin tends to become higher polymer and furthermore partial gelation is apt to occur, which often bring about variation in quality and reduction in reinforcement.

When the resulting phenolic resin composition is blended with rubber, particularly bead filler rubber of tire, amount of the phenolic resin composition is preferably 3–30 parts by weight, more preferably 5–20 parts by weight per 100 parts by weight of rubber. If amount of the composition is less than 3 parts by weight, effect obtained by blending the composition is small, and if it is more than 30 parts by weight, dispersion of the resin is ununiform to deteriorate properties as a blend.

Furthermore, amount of carbon black to be simultaneously blended is preferably 30–130 parts, more preferably 50–110 parts by weight per 100 parts by weight of rubber. If amount of carbon black is less than 30 parts by weight, reinforcing effect for the rubber-resin blend is small, and if it is more than 130 parts by weight, vulcanized rubber tends to become brittle.

Since the phenolic resin composition produced according to the present invention is modified with unsaturated oil or aromatic hydrocarbon resin, it is high in compatibility with rubber and furthermore, since curing reaction between phenolic resin and hexamine proceeds efficiently because of adduct formation thereof, amount of hexamine can be reduced. Moreover, amounts of ammonia gas generated and free hexamine are small, and hence tire cord of polyester fibers is not highly deteriorated.

The present invention will be explained by the following nonlimiting examples. "Parts" and "%" used in this specification are all by weight. Melting point, amount of free phenol and weight-average molecular weight described in this specification are measured by capillary method, gas chromatography method, and liquid chromatography method, respectively. Oil modification rate is expressed by weight ratio of modified oil to phenolic resin.

SYNTHESIS EXAMPLE 1

1000 Parts of cashew oil-modified novolak type phenolic resin A (melting point: 70° C., cashew oil modification rate: 30%; free phenol: 1.8%; weight-average molecular weight: 1950) and 90 parts of hexamine were kneaded on 8 inch open rolls having a roll gap of 5 mm and a surface temperature of 55° C. to make a sheet-like product, and this was further passed through the rolls ten times and then ground by a grinder to obtain a powdery phenolic resin composition D. Adduct-forming rate of D was 51% and weight-average molecular weight thereof was 1950.

SYNTHESIS EXAMPLE 2

500 Parts of unmodified novolak type phenolic resin B (melting point: 85° C.; free phenol: 2.0%; weight-average molecular weight: 2520), 500 parts of tall oil-modified solid novolak type phenolic resin C (melting point: 72° C.; tall oil modification rate: 40%; free phenol: 0.9%; weight-average molecular weight: 1650) and 80 parts of hexamine were kneaded using a twin-screw continuous kneading extruder at a discharging temperature of kneaded product of 110° C. and in a residence time of 7 minutes and then ground by a grinder to obtain a powdery phenolic resin composition E. Adduct-forming rate of E was 85% and weight-average molecular weight thereof was 2100. Melting point and weight-average molecular weight of a mixture of B and C in equal amount were 79° C. and 2080, respectively.

SYNTHESIS EXAMPLE 3

1000 Parts of cashew oil-modified novolak type phenolic resin A and 70 parts of hexamine were kneaded on 8 inch open rolls having a roll gap of 3 mm and a surface temperature of 65° C. to make a sheet-like product, and this was further passed through the rolls 12 times and then ground by a grinder to obtain a powdery phenolic resin composition F. Adduct-forming rate of F was 62% and weight-average molecular weight thereof was 1960.

SYNTHESIS EXAMPLE 4

1000 Parts of cashew oil-modified novolak type phenolic resin A and 100 parts of hexamine were kneaded using a twin-screw continuous kneading extruder at a discharging temperature of kneaded product of 100° C. and in a residence time of 5 minutes and then ground by a grinder to obtain a powdery phenolic resin composition G. Adduct-forming rate of G was 70% and weight-average molecular weight thereof was 1970.

SYNTHESIS EXAMPLE 5

1000 Parts of cashew oil-modified novolak type phenolic resin A and 90 parts of hexamine were kneaded on 8 inch open rolls having a roll gap of 7 mm and a surface temperature of 40° C. to make a sheet-like product, and this product was further passed through the rolls 5 times and then ground by a grinder to obtain a powdery phenolic resin composition H. Adduct-forming rate of H was 20% and weight-average molecular weight thereof was 1950.

SYNTHESIS EXAMPLE 6

Powdery phenolic resin composition I was obtained under the same conditions as in Synthesis Example 2 except that discharging temperature of kneaded product was 55° C. and residence time was 25 seconds. Adduct-forming rate of I was 15% and weight-average molecular weight thereof was 2080.

SYNTHESIS EXAMPLE 7

Powdery phenolic resin composition J was obtained under the same conditions as in Synthesis Example 2 except that discharging temperature of kneaded product was 130° C. and residence time was 10 minutes. Adduct-forming rate of J was 95% and weight-average molecular weight thereof was 3120.

SYNTHESIS EXAMPLE 8

1000 Parts of the cashew oil-modified novolak type phenolic resin A used in Synthesis Example 1 and 100 parts of hexamine were ground and mixed by a grinder to obtain a powdery phenolic resin composition K. Adduct-forming rate of K was 3% and weight-average molecular weight thereof was 1950.

SYNTHESIS EXAMPLE 9

1000 Parts of the unmodified novolak type phenolic resin B used in Synthesis Example 2 and 80 parts of hexamine were kneaded on 8 inch open rolls having a roll gap of 5 mm and a surface temperature of 55° C. to make a sheet-like product, and this product was further passed through the rolls 10 times and then ground by a grinder to obtain a powdery phenolic resin composition L. Adduct-forming rate of L was 70% and weight-average molecular weight thereof was 2520.

In order to confirm the effects of the present invention, each of the resin compositions obtained in the above synthesis examples was blended with rubber and characteristics of the blend were measured.

Various rubber compositions obtained by kneading at the formulations as shown in Table 1 by a Banbury mixer were vulcanized at 160° C. for 30 minutes by an oil hydraulic press to obtain vulcanized rubber sheets of 2 m thickness.

TABLE 1

| Components | Formulation Blending ratio |
| --- | --- |
| Natural rubber | 70 parts |
| Styrene-butadiene copolymer rubber | 30 parts |
| Carbon black (HAF) | 70 parts |
| Process oil | 10 parts |
| Zinc oxide | 5 parts |
| Stearic acid | 2 parts |
| Aging inhibitor (NOKLAK 224) | 1.5 parts |
| Vulcanization accelerator (NOKSELER MSA-G) | 1.5 parts |
| Sulfur | 4 parts |
| Hexamine | See Table 2 |
| Phenolic resin composition | See Table 2 |

®NOKLAK 224: Poly(2,2,4-trimethyl-1,2-dihydroquinoline)
®NOKSELER MSA-G: N-oxydiethylene-2-benzothiazolesulfenamide Hardness and 25% tensile modulus of these vulcanized rubber sheets were measured in accordance with JIS K 6301. Furthermore, test pieces of 2 mm thick, 5 mm wide and 20 mm long were prepared from these vulcanized rubber sheets, and dynamic modulus thereof was measured at room temperature using a viscoelasticity spectrometer.

Moreover, polyester fiber cords were embedded in the above various rubber compositions, and the compositions were vulcanized at 160° C. for 30 minutes, and then the cords were taken out and tensile strength of the cords was compared with that of the cords before the treatment to obtain retention percent of strength.

These results are shown in Table 2.

TABLE 2

| | Results of Practical Tests | | | | | | | | | | | | |
| --- | --- | --- | --- | --- | --- | --- | --- | --- | --- | --- | --- | --- | --- |
| | Examples | | | | | | Comparative Examples | | | | | | |
| | 1 | 2 | 3 | 4 | 5 | 6 | 1 | 2 | 3 | 4 | 5 | 6 | 7 |
| Kind of phenolic resin | D | D | E | E | F | G | A | B | H | I | J | K | L |

TABLE 2-continued

|  | Results of Practical Tests | | | | | | | | | | | | |
|---|---|---|---|---|---|---|---|---|---|---|---|---|
|  | Examples | | | | | | Comparative Examples | | | | | | |
|  | 1 | 2 | 3 | 4 | 5 | 6 | 1 | 2 | 3 | 4 | 5 | 6 | 7 |
| composition (Synthesis Example No.) | (1) | (1) | (2) | (2) | (3) | (4) | (*) | (*) | (5) | (6) | (7) | (8) | (9) |
| Blending ratio of phenolic resin composition | 15 | 20 | 15 | 20 | 15 | 15 | 15 | 15 | 15 | 15 | 15 | 15 | 15 |
| Blending ratio of hexamine | 0 | 0 | 0 | 0 | 0 | 0 | 3 | 3 | 0 | 0 | 0 | 0 | 0 |
| Properties of vulcanized rubber | | | | | | | | | | | | | |
| Shore hardness (A) | 96 | 98 | 95 | 97 | 95 | 96 | 92 | 90 | 93 | 91 | 92 | 92 | 91 |
| 25% tensile modulus (kg/cm$^2$) | 46 | 64 | 40 | 57 | 43 | 50 | 36 | 30 | 38 | 33 | 34 | 35 | 32 |
| Dynamic modulus E' ($\times 10^9$ dyn/cm$^2$) | 1.45 | 1.65 | 1.37 | 1.57 | 1.41 | 1.50 | 1.22 | 1.03 | 1.28 | 1.13 | 1.19 | 1.18 | 1.09 |
| Retention of strength of polyester cord (%) | 96 | 93 | 97 | 94 | 97 | 97 | 77 | 75 | 89 | 88 | 97 | 86 | 97 |

(*) Base resin containing no hexamine was used.

From the above results, it can be seen that resin compositions having novolak type phenolic resin and hexamine sufficiently converted into the adduct thereof are higher in effects to improve various characteristics of vulcanized rubber, even if amount of hexamine is reduced by about 30-60%, than compositions comprising novolak type phenolic resin and hexamine blended independently or novolak type phenolic resin compositions where hexamine is not sufficiently converted into the adduct thereof, and furthermore are less in generation of ammonia at vulcanization and so deterioration of polyester fiber cords can be inhibited.

Novolak type phenolic resin modified with cashew oil or tall oil improves characteristics of vulcanized rubber as compared with unmodified one.

When such resin composition is produced by an open roll or a kneading extruder, excellent reinforceability to rubber can be imparted and resin composition of stable quality can be obtained by selecting proper conditions.

As explained above, in the phenolic resin composition of the present invention, novolak type phenolic resin modified with unsaturated oil or aromatic hydrocarbon resin, which is superior in compatibility with rubber, and hexamine are converted into the adduct thereof and therefore, the resin and hexamine react efficiently whereby reinforcing effect for rubber can be improved and besides, amount of harmful ammonia generated can be reduced and thus deterioration of tire cords of polyester fibers can be inhibited.

Therefore, rubber compositions which contain the above phenolic resin composition can be used efficiently for bead filler portion of tire.

What is claimed is:

1. A process for producing a phenolic resin composition which comprises kneading hexamine and a novolak phenolic resin modified with 10-50% of an unsaturated oil or an aromatic hydrocarbon resin as essential components by an open roll or a kneading extruder to convert 30-90% of the hexamine into the adduct thereof.

2. A process according to claim 1, wherein the unsaturated oil is selected from the group consisting of cashew oil, tall oil, linseed oil and a mixture thereof.

3. A rubber composition which contains, as essential components, (a) a rubber and (b) a phenolic resin composition obtained by the process as set forth in claim 1.

4. A rubber composition according to claim 3, wherein the rubber is selected from the group consisting of natural rubber, polyisoprene rubber, polybutadiene rubber, styrene-butadiene copolymer rubber and mixtures thereof.

5. A rubber composition for bead filler of tire which contains, as essential components, (a) 100 parts by weight of a rubber selected from the group consisting of natural rubber, polyisoprene rubber, polybutadiene rubber, styrene-butadiene copolymer rubber and mixtures thereof, (b) 3-30 parts by weight of a phenolic resin composition obtained by the process as set forth in claim 1 and (c) 30-130 parts by weight of carbon black 6. A rubber composition for bead filler of tire according to claim 5, wherein polyester fiber is used as reinforcing cords of carcass layer.

7. A process according to claim 1 wherein said novolak phenolic resin comprises a reaction product of a phenol compound selected from the group consisting of phenol, cresol, and resorcin, with an aldehyde selected from the group consisting of formaldehyde, paraformaldehyde and benzaldehyde, reacted in the presence of an acid catalyst.

8. A rubber composition which contains, as essential components, (a) a rubber and (b) a phenolic resin composition obtained by the process as set forth in claim 2.

9. A rubber composition according to claim 8, wherein the rubber is selected from the group consisting of natural rubber, polyisoprene rubber, polybutadiene rubber, styrene-butadiene copolymer rubber and mixtures thereof.

10. A rubber composition for bead filler of tire which contains, as essential components, (a) 100 parts by weight of a rubber selected from the group consisting of natural rubber, polyisoprene rubber, polybutadiene rubber, styrene-butadiene copolymer rubber and mixtures thereof, (b) 3-30 parts by weight of a phenolic resin composition obtained by the process as set forth in claim 2 and (c) 30-130 parts by weight of carbon black.

11. A rubber composition for bead filler of tire according to claim 10, wherein polyester fiber is used as reinforcing cords of carcass layer.

* * * * *